United States Patent
Hsieh et al.

(10) Patent No.: US 9,244,504 B2
(45) Date of Patent: Jan. 26, 2016

(54) HEAT DISSIPATION STRUCTURE FOR HAND-HELD MOBILE DEVICE

(71) Applicant: ASIA VITAL COMPONENTS CO., LTD., New Taipei (TW)

(72) Inventors: Kuo-Chun Hsieh, New Taipei (TW); Chuan-Chin Huang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 219 days.

(21) Appl. No.: 14/034,561

(22) Filed: Sep. 24, 2013

(65) Prior Publication Data

US 2015/0083371 A1    Mar. 26, 2015

(51) Int. Cl.
*H05K 7/20* (2006.01)
*G06F 1/20* (2006.01)

(52) U.S. Cl.
CPC ........................................ *G06F 1/20* (2013.01)

(58) Field of Classification Search
CPC ... H05K 7/20309; H05K 7/20336; G06F 1/20
USPC ......... 361/688–723; 165/104.11–104.34, 185
See application file for complete search history.

(56) References Cited

U.S. PATENT DOCUMENTS

| | | | |
|---|---|---|---|
| 2006/0126304 A1* | 6/2006 | Smalc et al. | 361/704 |
| 2009/0310296 A1* | 12/2009 | Peng et al. | 361/679.49 |
| 2011/0100607 A1* | 5/2011 | Li et al. | 165/104.26 |
| 2012/0307453 A1* | 12/2012 | Yan et al. | 361/704 |
| 2013/0050953 A1* | 2/2013 | Sano et al. | 361/720 |

* cited by examiner

*Primary Examiner* — Anthony Haughton
*Assistant Examiner* — Yahya Ahmad

(57) ABSTRACT

A heat dissipation structure for hand-held mobile device includes a supporting body having a first and an opposite second side and including at least one heat dissipation area. In the heat dissipation area, a heat dissipation element is correspondingly fitted without increasing an overall thickness and volume of the supporting body for the hand-held mobile device. With the heat dissipation element fitted in the heat dissipation area on the supporting body, heat produced by the hand-held mobile device during operation thereof can be quickly transferred to the heat dissipation element for dissipating into ambient air.

6 Claims, 9 Drawing Sheets

HEAT DISSIPATION STRUCTURE FOR HAND-HELD MOBILE DEVICE

FIELD OF THE INVENTION

The present invention relates to a heat dissipation structure for hand-held mobile device, and more particularly, to a heat dissipation structure that can be applied to a hand-held mobile device without increasing an overall thickness or volume or occupying any narrow internal space of the hand-held mobile device while upgrading the latter's heat dissipation performance.

BACKGROUND OF THE INVENTION

The currently available hand-held mobile devices have higher and higher performance gained by using a multi-core central processing unit (CPU) having two, four or even more cores. However, with the multi-core CPU that has largely increased operating speed, the heat produced by the hand-held mobile device during operation thereof also disadvantageously increases, which necessitates more efficient heat dissipation solution for the hand-held mobile device.

According to a conventional technical means, a piece of graphite material is correspondingly attached to a heat source of the hand-held mobile device to enable good transfer of heat from the device to an external environment via the graphite material. However, to meet the demand for compactness and light weight, the current hand-held mobile devices all have a very limited internal space, which is too small to accommodate an additional graphite material. In other words, the use of the graphite material would inevitably increase the overall thickness, volume or weight of the mobile devices. It is therefore an important and challenging issue as how to provide a heat-dissipation structure that can be mounted in a hand-held mobile device to effectively solve its problem of heat dissipation without increasing the overall thickness, volume or weight thereof.

SUMMARY OF THE INVENTION

A primary object of the present invention is to provide a heat dissipation structure for hand-held mobile device, which does not increase an overall thickness and volume of the hand-held mobile device or occupy any narrow internal space thereof while upgrading the device's heat dissipation performance.

To achieve the above and other objects, the heat dissipation structure for hand-held mobile device according to the present invention includes a supporting body having a first side and an opposite second side and including a heat dissipation area, at where a heat dissipation element is located.

The heat dissipation element is fitted in the heat dissipation area on the supporting body, and has a heat absorption surface flush with the first side of the supporting body and an opposite heat dissipation surface flush with or at least not protruded from the second side of the supporting body. That is, the heat dissipation element does not protruded from the first and the second side of the supporting body and accordingly, does not increase the thickness or the volume of the supporting body.

With the above arrangements, the heat dissipation structure according to the present invention can be mounted in the very limited internal space of the hand-held mobile device without increasing the overall thickness or volume thereof while advantageously solves the heat dissipation problem of the hand-held mobile device and upgrades the heat dissipation efficiency thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
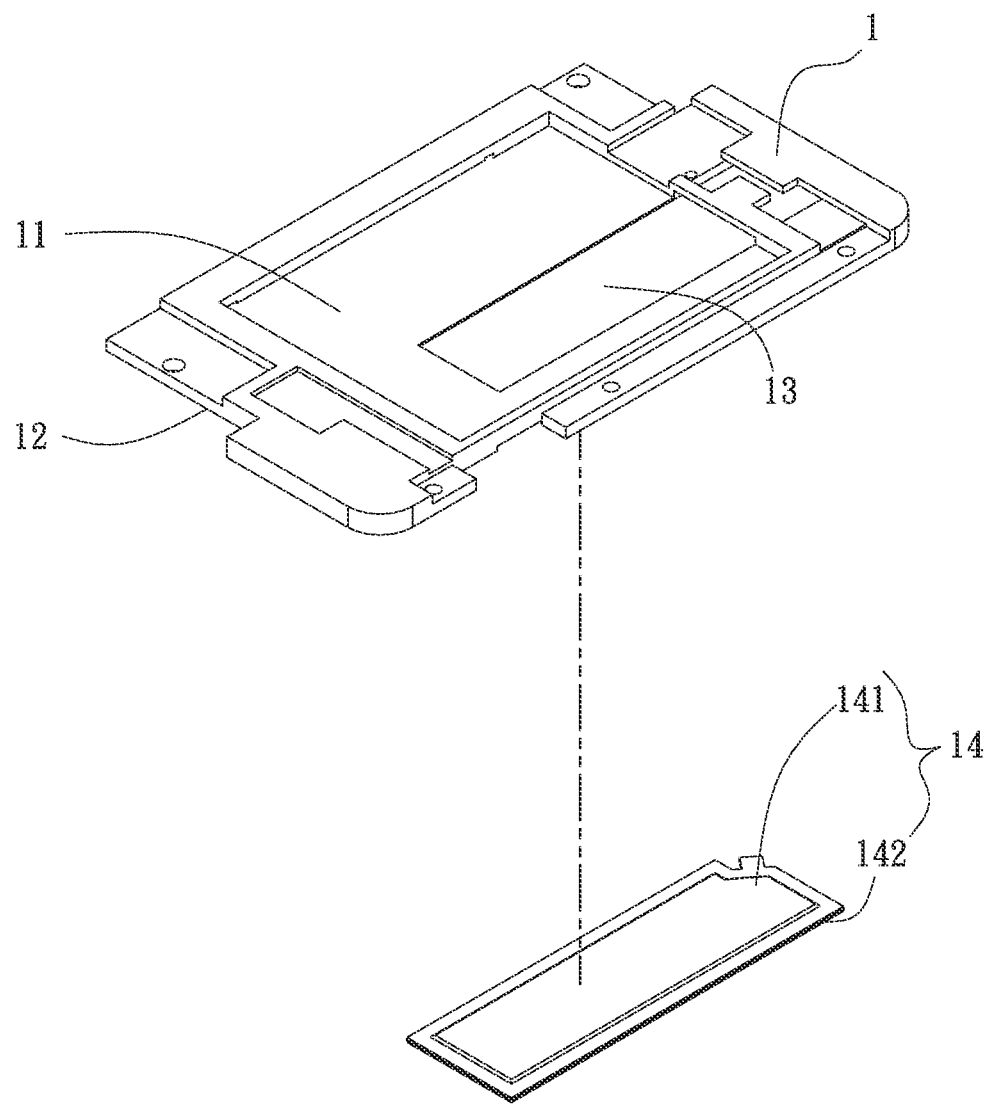
FIG. 1 is an exploded perspective view of a heat dissipation structure for hand-held mobile device according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
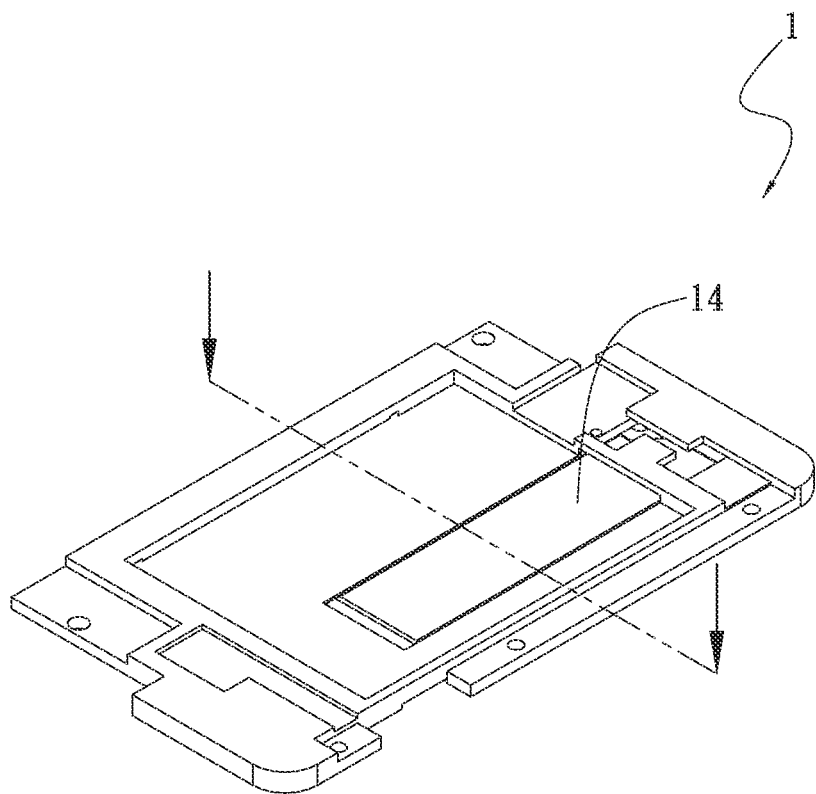
FIG. 2 is an assembled view of FIG. 1.
Figure 3:
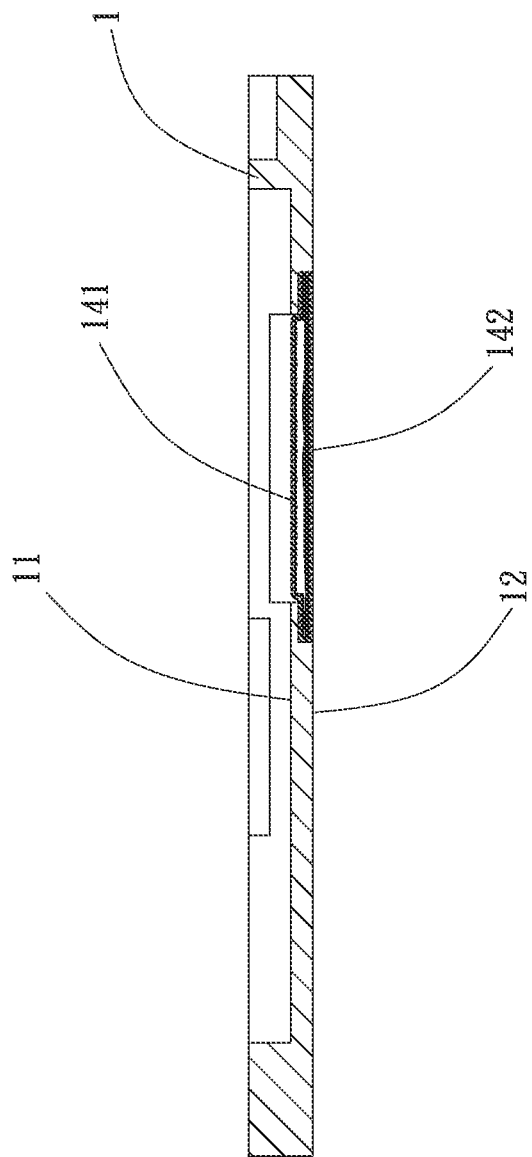
FIG. 3 is a sectional view of FIG. 2.

Please refer to FIGS. 1 and 2, which are exploded and assembled perspective views, respectively, of a heat dissipation structure for hand-held mobile device according to a first embodiment of the present invention; and to FIG. 3, which is a sectional view of FIG. 2. As shown, the heat dissipation structure for hand-held mobile device in the first embodiment of the present invention includes a supporting body 1, which is configured for mounting in a hand-held mobile device for carrying electronic elements or a display unit or a battery thereon (not shown). For the purpose of conciseness and clarity, the present invention is also briefly referred to as "the heat dissipation structure" herein.

The supporting body 1 has a first side 11 and an opposite second side 12, and includes at least one heat dissipation area 13, at where a heat dissipation element 14 is located.

In the first embodiment, the heat dissipation area 13 is an opening that extends through the supporting body 1 in a thickness direction thereof to communicate the first side 11 with the second side 12. The heat dissipation element 14 is correspondingly fitted in the opening forming the heat dissipation area 13, and has a heat absorption surface 141 and an opposite heat dissipation surface 142. When the heat dissipation element 14 is fitted in the opening, the heat absorption surface 141 and the heat dissipation surface 142 are flush with the first side 11 and the second side 12 of the supporting body 1, respectively, The heat dissipation element 14 can be a vapor chamber or a thin heat pipe. In the first embodiment of the present invention, while the heat dissipation element 14 is shown as a vapor chamber, it is understood the vapor chamber is only illustrative and not intended to limit the present invention in any way. The heat dissipation element 14 can be joined to the supporting body 1 by way of riveting, diffusion bonding, welding, gluing, or any other functionally equivalent ways without particular limitation.

Figure 4:
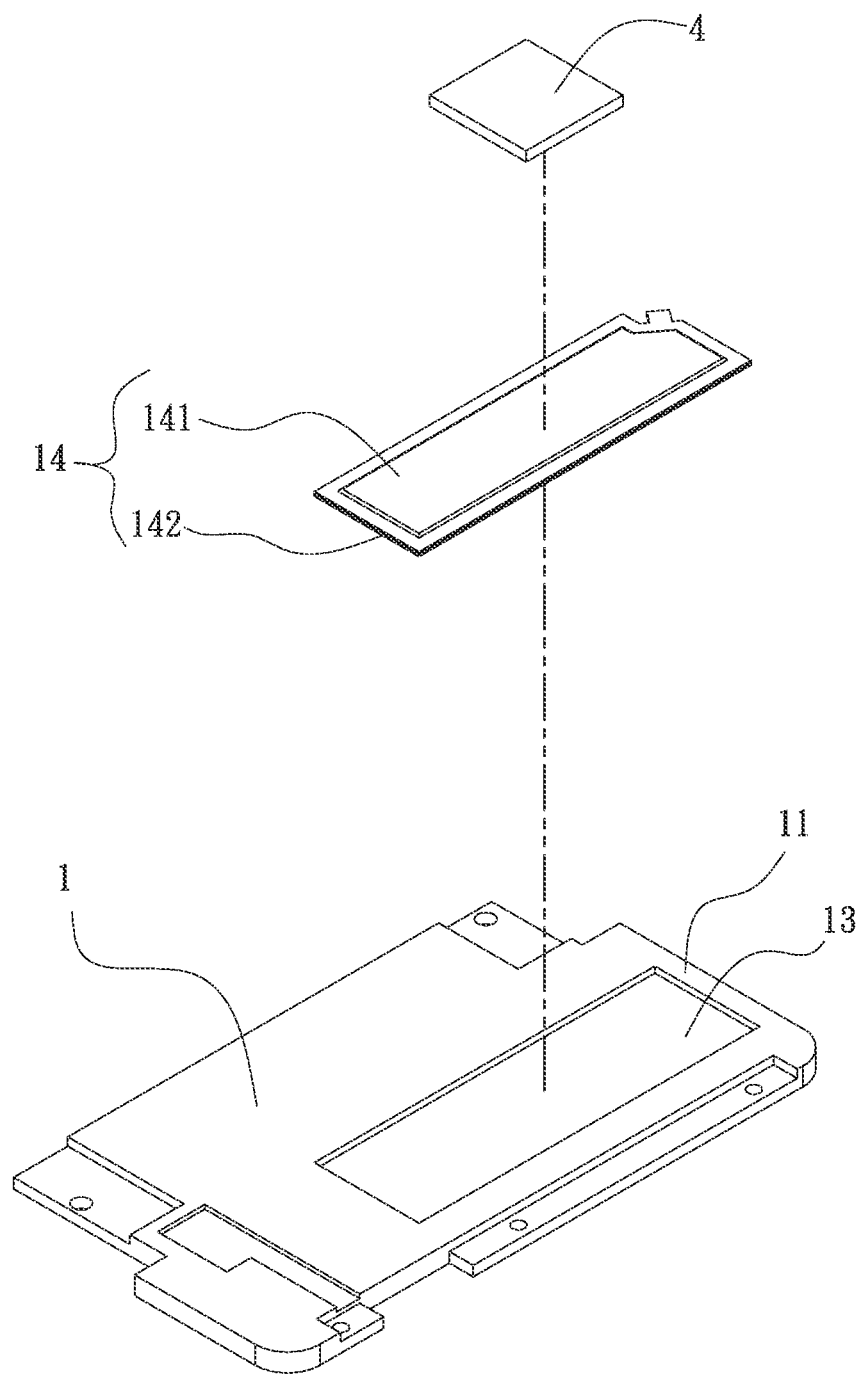
FIG. 4 is an exploded perspective view of a heat dissipation structure for hand-held mobile device according to a second embodiment of the present invention.
Figure 5:
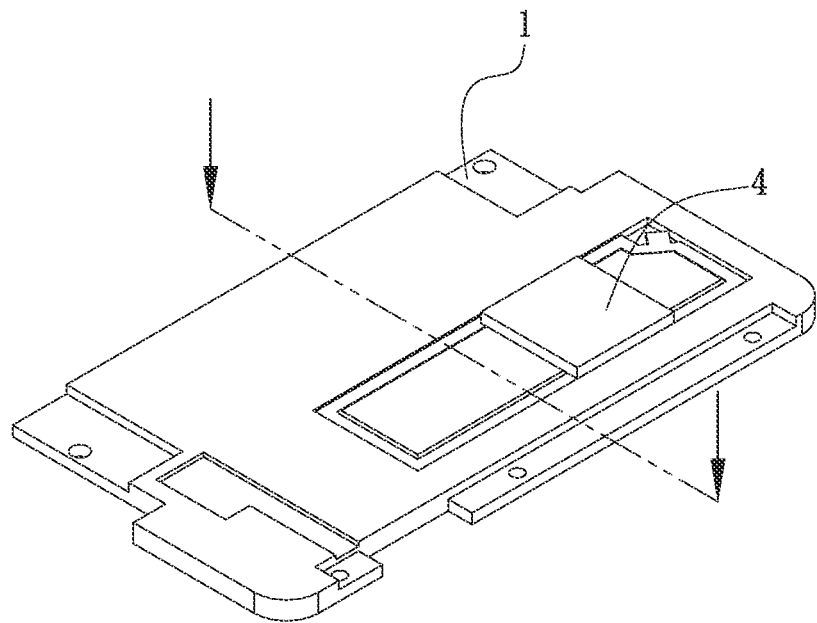
FIG. 5 is an assembled view of FIG. 4.
Figure 6:
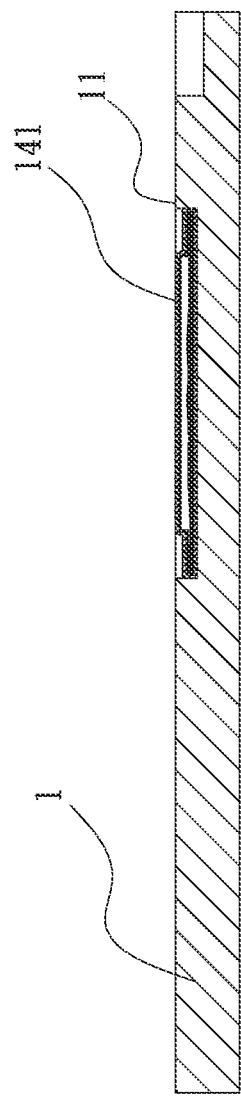
FIG. 6 is a sectional view of FIG. 5.

FIGS. 4 and 5 are exploded and assembled perspective views, respectively, of a heat dissipation structure for hand-held mobile device according to a second embodiment of the present invention, and FIG. 6 is a sectional view of FIG. 5. As shown, the heat dissipation structure in the second embodiment is generally structurally similar to that in the first embodiment, except that the heat dissipation area 13 in the second embodiment is configured as a recess sunk from the first side 11 of the supporting body 1. The heat dissipation element 14 is correspondingly fitted in the recess forming the heat dissipation area 13, and has a heat absorption surface 141 and an opposite heat dissipation surface 142. The heat absorption surface 141 is flush with the first side 11 of the supporting body 1 to contact with a heat-producing unit 4, and the heat dissipation surface 142 is in flat contact with a bottom of the recess on the supporting body 1.

Figure 7:
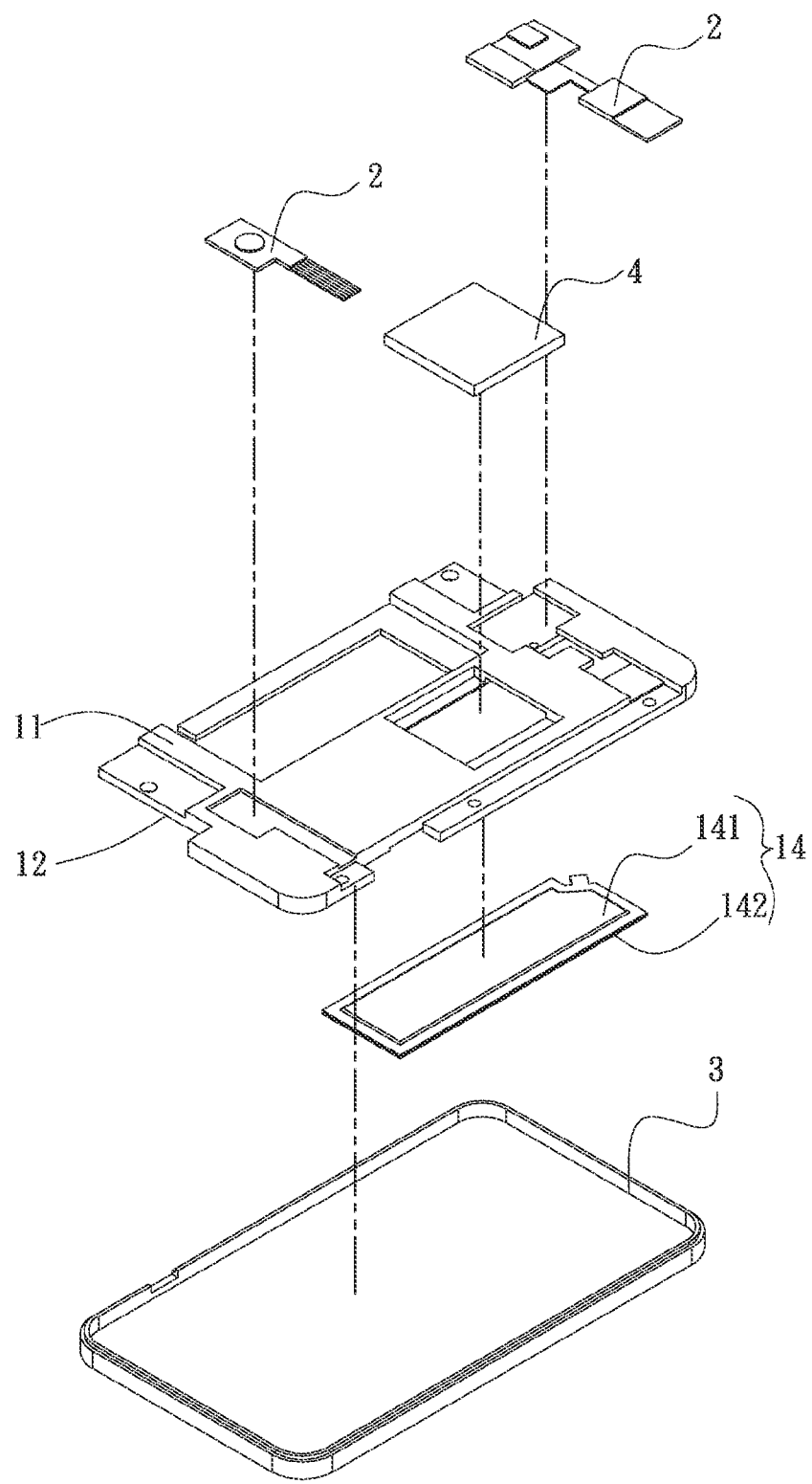
FIG. 7 is an exploded perspective view of a heat dissipation structure for hand-held mobile device according to a third embodiment of the present invention.
Figure 8:
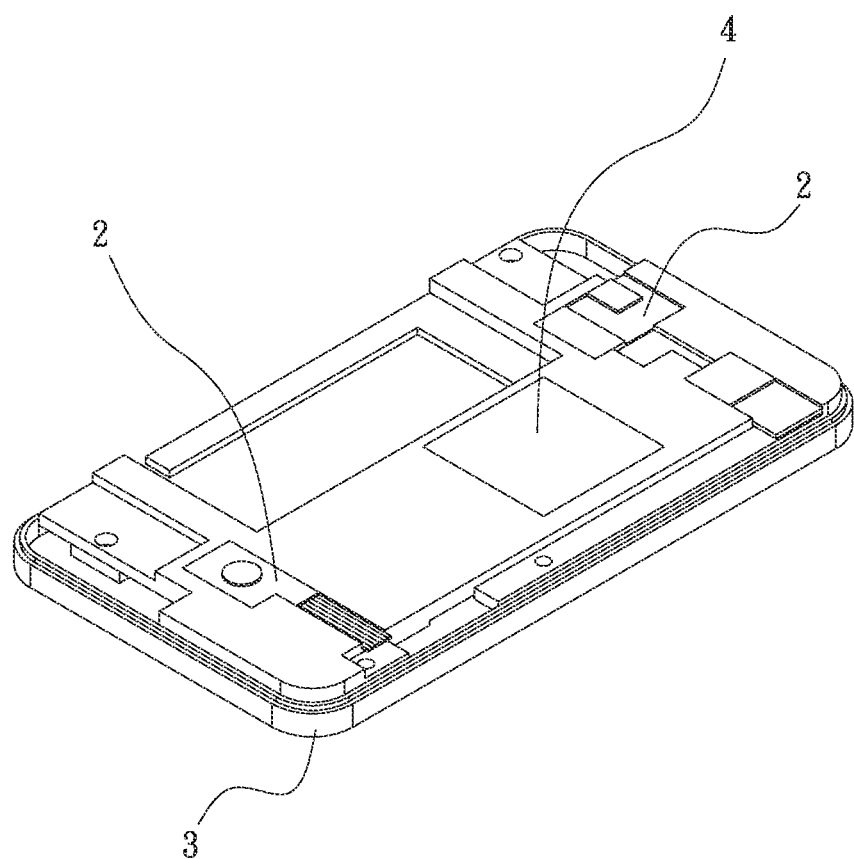
FIG. 8 is an assembled view of FIG. 7.

FIGS. 7 and 8 are exploded and assembled perspective views, respectively, of a heat dissipation structure for hand-held mobile device according to a third embodiment of the present invention. As shown, the heat dissipation structure in the third embodiment is generally structurally similar to that in the first embodiment but further includes at least one electronic element 2 and at least one case member 3. At least one or both of the first and the second side 11, 12 have the at least one electronic element 2 attached thereto. The heat dissipation element 14 has a heat absorption surface 141 and an opposite heat dissipation surface 142. The heat absorption surface 141 is in flat contact with at least one heat-producing unit 4; and the heat dissipation surface 142 is in flat contact with the case member 3. Alternately, the heat dissipation surface 142 can be integrally formed with the case member 3 for directly exchanging heat with ambient air. The electronic element 2 can be any one of a circuit board, a chip and a liquid crystal display (LCD); and the heat-producing unit 4 can be any one of a chip, a central processing unit and a battery.

Figure 9:
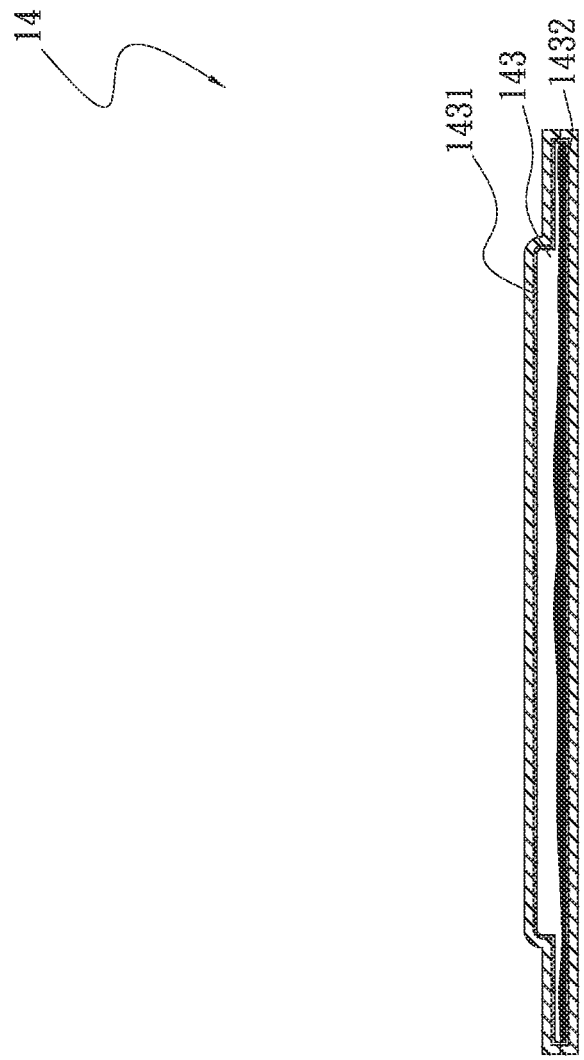
FIG. 9 is a sectional view of a heat dissipation element included in the heat dissipation structure for hand-held mobile device according to the present invention.

Please refer to FIG. 9, which is a sectional view of the heat dissipation element 14 included in the heat dissipation structure for hand-held mobile device according to any of the first to the third embodiment of the present invention. As shown, the heat dissipation element 14 internally defines a chamber 143, in which a layer of wick structure 1431 and a working fluid 1432 are provided.

The heat dissipation structure for hand-held mobile device according to the present invention can be applied to various kinds of hand-held mobile devices and electronic devices, such as mobile phones, tablet computers, personal digital assistants (PDAs), and digital display devices. With the heat dissipation structure of the present invention, heat produced by heat-producing electronic elements and accumulated in the hand-held mobile device can be quickly transferred to other different places for dissipating into ambient air.

The heat dissipation structure for hand-held device according to the present invention advantageously improves the dissipation of internal heat from the hand-held mobile device. Further, since the heat dissipation element is directly associated with the supporting body without increasing an overall thickness and volume of the hand-held mobile device or occupying any narrow internal space thereof, the best possible heat dissipation performance can be achieved for the hand-held mobile device.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A heat dissipation structure for hand-held mobile device, comprising a supporting body; the supporting body having a first side and an opposite second side, and including at least one heat dissipation area, at where a heat dissipation element is located; and wherein the first side of the supporting body has at least one electronic element attached thereto and the second side of the supporting body is attached to at least one case member; and wherein the heat dissipation element has a heat absorption surface and an opposite heat dissipation surface; the heat absorption surface being in flat contact with at least one heat-producing unit, and the heat dissipation surface being in flat contact with the case member.

2. The heat dissipation structure for hand-held mobile device as claimed in claim 1, wherein the heat dissipation area is an opening extended through the supporting body in a thickness direction thereof to communicate the first side with the second side; the heat dissipation element being correspondingly fitted in the opening and having a heat absorption surface and an opposite heat dissipation surface; the heat absorption surface being flush with the first side of the supporting body, and the heat dissipation surface being flush with the second side of the supporting body.

3. The heat dissipation structure for hand-held mobile device as claimed in claim 1, wherein the heat dissipation element is selected from the group consisting of a vapor chamber and a thin heat pipe.

4. The heat dissipation structure for hand-held mobile device as claimed in claim 1, wherein the heat dissipation element is joined to the supporting body by a means selected from the group consisting of riveting, diffusion bonding, welding and gluing.

5. The heat dissipation structure for hand-held mobile device as claimed in claim 1, wherein the heat dissipation area is configured as a recess sunk from the first side of the supporting body; the heat dissipation element being correspondingly fitted in the recess and having a heat absorption surface and an opposite heat dissipation surface; the heat absorption surface being flush with the first side of the supporting body and in flat contact with a heat-producing unit, and the heat dissipation surface being in flat contact with a bottom of the recess on the supporting body.

6. The heat dissipation structure for hand-held mobile device as claimed in claim 1, wherein the heat dissipation element internally defines a chamber, in which a layer of wick structure and a working fluid is provided.

* * * * *